United States Patent
Watanabe et al.

(10) Patent No.: US 10,480,504 B2
(45) Date of Patent: Nov. 19, 2019

(54) ENGINE ROTATIONAL SPEED CONTROL APPARATUS

(71) Applicant: TOYOTA JIDOSHA KABUSHIKI KAISHA, Toyota-shi, Aichi-ken (JP)

(72) Inventors: Hiroshi Watanabe, Miyoshi (JP); Yasumichi Inoue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 737 days.

(21) Appl. No.: 14/667,106

(22) Filed: Mar. 24, 2015

(65) Prior Publication Data

US 2015/0291004 A1 Oct. 15, 2015

(30) Foreign Application Priority Data

Apr. 11, 2014 (JP) .................. 2014-082378

(51) Int. Cl.
*F04B 49/20* (2006.01)
*B60H 1/00* (2006.01)
*B60H 1/32* (2006.01)

(52) U.S. Cl.
CPC ......... *F04B 49/20* (2013.01); *B60H 1/00735* (2013.01); *B60H 1/3205* (2013.01); *F04B 2201/1202* (2013.01)

(58) Field of Classification Search
CPC ........ F04B 35/002; F04B 49/02; F04B 49/08; F04B 49/20; F04B 2201/1201; F04B 2201/1202; B60H 1/00735; B60H 1/3205
USPC .............. 123/339.1, 339.15, 339.16, 339.17, 123/339.18
See application file for complete search history.

(56) References Cited

U.S. PATENT DOCUMENTS

| | | | |
|---|---|---|---|
| 4,492,195 A | 1/1985 | Takahashi et al. | |
| 5,666,917 A | 9/1997 | Fraser et al. | |
| 6,336,335 B2 * | 1/2002 | Ota | B60H 1/3208 |
| | | | 123/198 R |
| 6,688,282 B1 * | 2/2004 | Okubo | F02D 31/003 |
| | | | 123/334 |

(Continued)

FOREIGN PATENT DOCUMENTS

| EP | 1624173 A2 | 2/2006 |
|---|---|---|
| JP | H09-287501 A | 11/1997 |

(Continued)

*Primary Examiner* — Bryan M Lettman
*Assistant Examiner* — Charles W Nichols
(74) *Attorney, Agent, or Firm* — Oliff PLC (57) ABSTRACT

A rotational speed control apparatus for an engine is provided. The engine configured to drive a compressor that compresses a cooling medium for air conditioning. The rotational speed control apparatus includes electronic control unit. The electronic control unit is configured to: (a) correct a torque of the engine through feedback in accordance with a deviation between a rotational speed during idle operation and a target rotational speed; (b) (i) calculate a load torque of the compressor, and (ii) correct the calculated load torque through feedback in accordance with a deviation between the rotational speed of the engine and the target rotational speed and correct a required value of the torque of the engine in accordance with the corrected load torque, in a predetermined period from a start of a changeover between a driven state of the compressor and a stopped state of the compressor.

5 Claims, 5 Drawing Sheets

(56) References Cited

U.S. PATENT DOCUMENTS

| | | | | |
|---|---|---|---|---|
| 6,742,498 B2 * | 6/2004 | Mabuchi | ............... | F02D 31/003 123/339.16 |
| 6,895,928 B2 * | 5/2005 | Shepperson | ............ | F02D 37/02 123/339.11 |
| 7,514,892 B2 * | 4/2009 | Pedersen | .............. | H02H 7/0816 318/282 |
| 2002/0050269 A1 * | 5/2002 | Osanai | .................. | F02D 31/003 123/339.11 |
| 2009/0324427 A1 * | 12/2009 | Tolbert, Jr. | .......... | F04B 39/0207 417/13 |
| 2014/0216081 A1 * | 8/2014 | West | ..................... | F25B 49/022 62/126 |

FOREIGN PATENT DOCUMENTS

| | | |
|---|---|---|
| JP | 2003-214231 A | 7/2003 |
| JP | 2010-065571 A | 3/2010 |
| JP | 2012-172614 A | 9/2012 |

\* cited by examiner

ENGINE ROTATIONAL SPEED CONTROL APPARATUS

INCORPORATION BY REFERENCE

The disclosure of Japanese Patent Application No. 2014-0802378 filed on Apr. 11, 2014 including the specification, drawings and abstract is incorporated herein by reference in its entirety.

BACKGROUND OF THE INVENTION

1. Field of the Invention

The invention relates to an engine rotational speed control apparatus that corrects an engine torque through feedback such that an engine rotational speed during idle operation becomes close to a target rotational speed.

2. Description of Related Art

An apparatus described in Japanese Patent Application Publication No. 2003-214231 (JP-2003-214231 A) is known as a control apparatus as mentioned above. In the apparatus described in the publication, a required torque that is calculated in accordance with an operation state of an engine is corrected through feedback in accordance with a deviation of an engine rotational speed from a target rotational speed. Thus, feedback control of the engine rotational speed during idle operation, so-called idle speed control (ISC) feedback is executed. Besides, when a compressor that compresses a cooling medium for air conditioning is in operation, a torque corresponding to a driving load of the compressor (hereinafter referred to as an AC load torque) is obtained to further correct the required torque of the engine, thereby suppressing rotational fluctuations of the engine.

SUMMARY OF THE INVENTION

In a changeover transition period between the driven state of the compressor and the stopped state of the compressor, the aforementioned AC load torque greatly varies depending on the state of the cooling medium. Therefore, the actual AC load torque in the changeover transition period may greatly diverge from its expected value. In order to suppress rotational fluctuations of the engine resulting from this variation in the AC load torque during the changeover transition period, the feedback gain of the engine torque needs to be increased such that the engine torque corresponding to the aforementioned divergence can be swiftly compensated for. In such a case, however, the feedback gain is excessively large during normal ISC feedback except in the changeover transition period. As a result, hyperresponsiveness occurs to cause an engine stall, the racing of the engine rotational speed, and the like.

The invention provides an engine rotational speed control apparatus that can favorably suppress rotational fluctuations of an engine in a transition period of a changeover between a driven state of a compressor and a stopped state of the compressor, without causing hyperresponsiveness of feedback control of an engine rotational speed during idle operation.

A rotational speed control apparatus for an engine according to one aspect of the invention is provided. The engine is configured to drive a compressor that compresses a cooling medium for air conditioning. The rotational speed control apparatus includes an electronic control unit. The electronic control unit is configured to (a) correct a torque of the engine through feedback in accordance with a deviation between a rotational speed during idle operation and a target rotational speed; (b) (i) calculate a load torque of the compressor, and (ii) correct the calculated load torque through feedback in accordance with a deviation between the rotational speed of the engine and the target rotational speed and correct a required value of the torque of the engine in accordance with the corrected load torque, in a predetermined period from a start of a changeover between a driven state of the compressor and a stopped state of the compressor. The start of the changeover is during idling stability of the engine.

In the rotational speed control apparatus according to the aforementioned aspect of the invention, when a changeover between the driven state of the compressor and the stopped state of the compressor is made during idling stability of the engine, the load torque of the compressor is calculated in a predetermined period from the start of the changeover, and the required value of the engine torque prior to the execution of the feedback correction is corrected in accordance with the load torque. At this time, if the calculated value of the load torque has diverged from its actual value, the rotational speed of the engine diverges from the target rotational speed. Then, the divergence between the rotational speed of the engine and the target rotational speed, which is caused during the aforementioned changeover, is mostly considered to result from the divergence of the calculated value of the aforementioned load torque. Accordingly, when the calculated value of the load torque is corrected through feedback in accordance with the deviation between the rotational speed of the engine and the target rotational speed, the calculated value of the load torque can be made close to its actual value.

In the aforementioned aspect of the invention, the calculated value of the aforementioned load torque is corrected through feedback in the changeover transition period between the driven state of the compressor and the stopped state of the compressor, when the load torque greatly varies depending on the state of the cooling medium. Therefore, rotational fluctuations resulting from variations in the load torque can be favorably suppressed. Moreover, the calculated value of the load torque is thus corrected through feedback only in the changeover transition period, so ISC feedback during a normal period is not influenced. Furthermore, according to the feedback correction of the calculated value of the aforementioned load torque, only the value corresponding to the influence of the variations in the load torque can be directly compensated for. Therefore, the engine torque can be corrected through feedback with high accuracy so as to suppress rotational fluctuations of the engine resulting from variations in the load torque.

Accordingly, rotational fluctuations of the engine in the changeover transition period between the driving of the compressor and the stop of the compressor can be favorably suppressed without causing hyperresponsiveness of feedback control of the engine rotational speed during idling operation.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Figure 1:
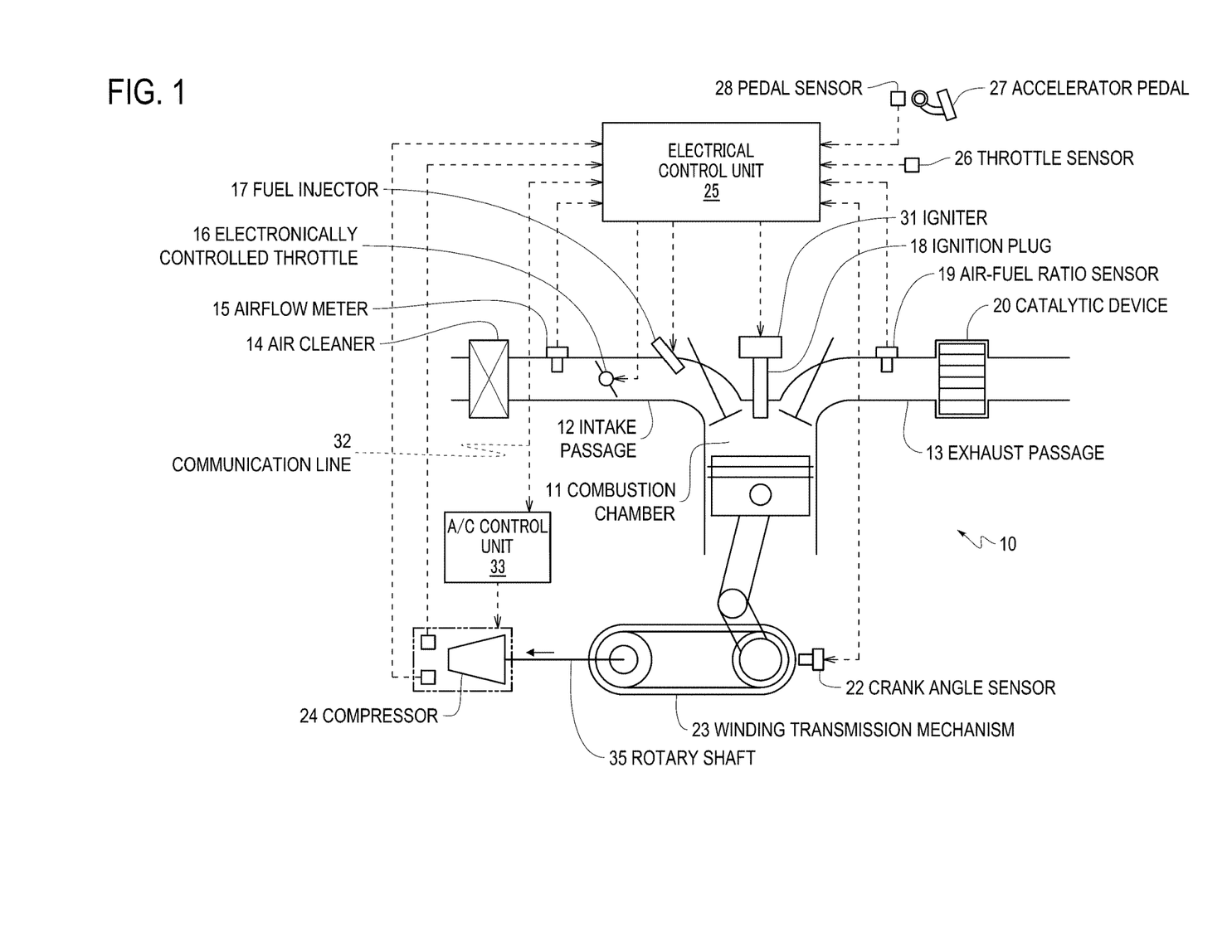
FIG. 1 is a diagram schematically showing the configuration of an engine rotational speed control apparatus according to the embodiment of the invention.

An engine rotational speed control apparatus according to one embodiment of the invention will be described hereinafter in detail with reference to FIGS. 1 to 8. As shown in FIG. 1, an engine 10 to which the rotational speed control apparatus according to the present embodiment of the invention is applied is equipped with an intake passage 12 for causing intake air sucked into a combustion chamber 11 of the engine 10 to flow therethrough, and an exhaust passage 13 for causing exhaust gas generated through the combustion in the combustion chamber 11 to flow therethrough. The intake passage 12 is provided, sequentially from an upstream side, with an air cleaner 14 that purifies intake air, an airflow meter 15 for detecting a flow rate of intake air in the intake passage 12 (an intake air amount GA), an electronically controlled throttle 16 that makes a flow passage area of intake air in the intake passage 12 variable to adjust the intake air amount GA, and an injector 17 that injects fuel into intake air. Besides, an ignition plug 18 for igniting the mixture of the intake air sucked into the combustion chamber 11 and the fuel injected from the injector 17 is installed in the combustion chamber 11. Furthermore, an air-fuel ratio sensor 19 that detects a concentration of oxygen in exhaust gas and hence an air-fuel ratio of the mixture burned in the combustion chamber 11, and a catalytic device 20 for purifying exhaust gas are installed in the exhaust passage 13.

On the other hand, a crank angle sensor 22 that detects a rotational phase of a crankshaft 21 as an output shaft of the engine 10 and hence a rotational speed thereof (an engine rotational speed NE) is installed on the crankshaft 21. Besides, a compressor 24 that compresses a cooling medium for air conditioning is drivingly coupled to the crankshaft 21 via a winding transmission mechanism 23.

This engine 10 is controlled by an electronic control unit 25. The electronic control unit 25 is equipped with a central processing unit (a CPU) that executes various calculation processes for engine control, a read only memory (a ROM) in which a control program and data are stored, a random access memory (a RAM) that temporarily stores a calculation result of the CPU, detected results of sensors and the like, and an interface (an I/O) for transmitting/receiving signals to/from the outside.

Various sensors for detecting an operating condition of the engine such as the aforementioned airflow meter 15, the aforementioned air-fuel ratio sensor 19, the aforementioned crank angle sensor 22 and the like are connected to the I/O of the electronic control unit 25. The other sensors connected to the I/O include a throttle sensor 26 that detects an opening degree of the electronically controlled throttle 16, an accelerator pedal sensor 28 that detects a depression amount of an accelerator pedal 27 (an accelerator operation amount ACCP), and the like. Besides, a cooling medium pressure sensor 29 that detects a pressure of the cooling medium discharged from the compressor 24, and a post-evaporation temperature sensor 30 that detects a temperature of the cooling medium that has passed through an evaporator (a post-evaporation temperature) are also connected to the I/O.

Furthermore, drive circuits of various actuators for operating the engine 10, such as an igniter 31 that generates a high-voltage current supplied to the aforementioned electronically controlled throttle 16, the aforementioned injector 17, and the aforementioned ignition plug 18 and the like are also connected to the I/O of the electronic control unit 25. Besides, a communication line 32 of an in-vehicle network is connected to the I/O of the electronic control unit 25. This communication line 32 enables communication with an air-conditioning control unit 33 that is located outside.

Figure 2:
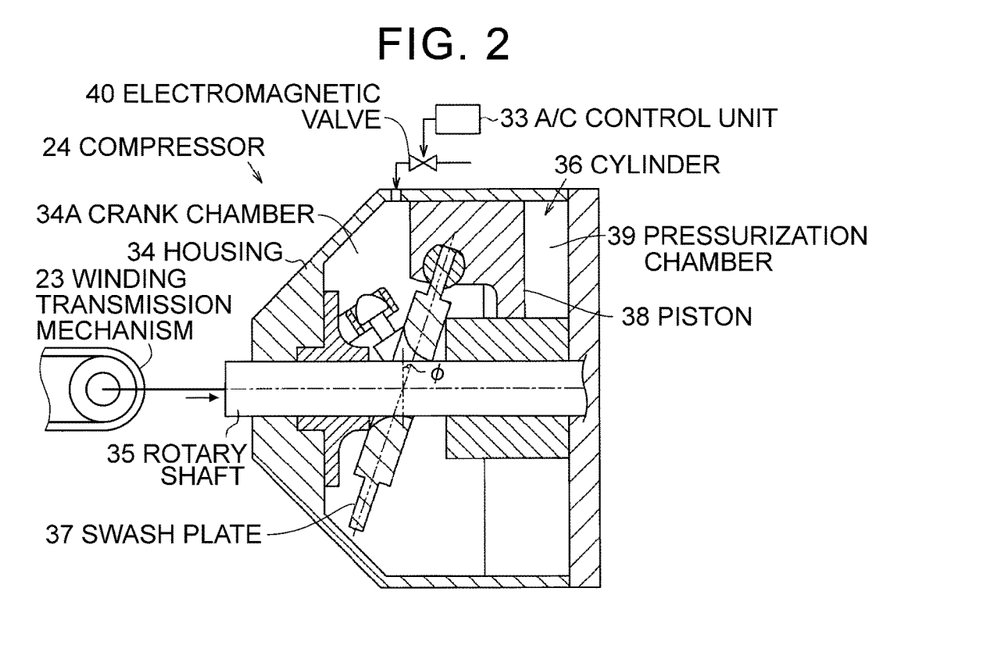
FIG. 2 is a cross-sectional view schematically showing the configuration of a variable capacity-type swash plate compressor for air conditioning that is provided as an auxiliary of an engine to which the rotational speed control apparatus is applied.

FIG. 2 shows the configuration of the aforementioned compressor 24. As shown in the drawing, the compressor 24 is configured as a swash plate-type variable capacity compressor. That is, the compressor 24 has a rotary shaft 35 that is rotatably and pivotally supported by a housing 34 of the compressor 24. This rotary shaft 35 is drivingly coupled to the crankshaft 21 of the engine 10 via the aforementioned winding transmission mechanism 23. Besides, a crank chamber 34A, and a cylinder 36 that communicates with the crank chamber 34A are formed inside the housing 34.

A swash plate 37 is disposed in the crank chamber 34A. The swash plate 37 is integrally rotatably and tiltably supported by the rotary shaft 35. Besides, a piston 38 is disposed in the cylinder 36 in such a manner as to be reciprocable therein. Then, a pressurization chamber 39 for pressurizing the cooling medium is defined by the piston 38 inside the cylinder 36.

The piston 38 moves in a reciprocating manner in the cylinder 36 while being pressed by the swash plate 37, and thereby pressurizes the cooling medium introduced into the pressurization chamber 39. The stroke of reciprocating movements of the piston 38 at this time changes depending on an angle $\phi$ of inclination of the swash plate 37, so the capacity of the compressor 24 is made variable. Incidentally, the angle $\phi$ of inclination of the swash plate 37 will be described hereinafter as an angle with respect to a plane perpendicular to an axis of the rotary shaft 35.

The angle $\phi$ of inclination of the swash plate 37 changes depending on the balance of pressure between the crank chamber 34A side of the piston 38 and the pressurization chamber 39 side of the piston 38. That is, the pressure in the crank chamber 34A is applied to the crank chamber 34A side of the piston 38, and the pressure introduced into the pressurization chamber 39 is applied to the pressurization chamber 39 side of the piston 38. When the pressure in the crank chamber 34A is low, the force received by the piston 38 from the pressurization chamber 39 side is larger than the force received by the piston 38 from the crank chamber 34A side. At this time, the angle ϕ of inclination of the swash plate 37 becomes large due to the pressing by the piston 38.

On the other hand, when the pressure in the crank chamber 34A is high, the force received by the piston 38 from the crank chamber 34A side is larger than the force received by the piston 38 from the pressurization chamber 39 side. At this time, the angle ϕ of inclination of the swash plate 37 becomes small due to the pressing by the piston 38. Incidentally, when the angle ϕ of inclination of the swash plate 37 becomes "0", the stroke of the piston 38 also becomes "0", and the compressor 24 stops the operation of pressurizing the cooling medium. At this time, almost no load is applied to the rotation of the rotary shaft 35 of the compressor 24.

In this case, the state where the load torque of the engine 10 associated with the driving of the compressor 24 is "0", namely, the state where the compressor 24 has stopped the operation of compressing the cooling medium is referred to as a stopped state of the compressor 24. Besides, the state where the load torque assumes a positive value, namely, the state where the compressor 24 executes the operation of compressing the cooling medium is referred to as a driven state of the compressor 24. Then, the period from a changeover from the stopped state of the compressor 24 to the driven state of the compressor 24 to the convergence of the load torque to a stable value through an increase from "0", and the period from a changeover from the driven state of the compressor 24 to the stopped state of the compressor 24 to the convergence of the load torque to "0" through a decrease are each referred to as a changeover transition period.

Incidentally, the pressure in the crank chamber 34A is adjusted by an electromagnetic valve 40. The operation of the electromagnetic valve 40 is controlled by the air-conditioning control unit 33. In the engine 10 that is equipped with this compressor 24 as an auxiliary, feedback control (hereinafter referred to as ISC feedback) for making the engine rotational speed NE close to a target rotational speed (an ISC target rotational speed NT) is executed during idle operation of the engine 10. ISC feedback in this engine 10 is executed according to a so-called torque demand method.

Figure 3:
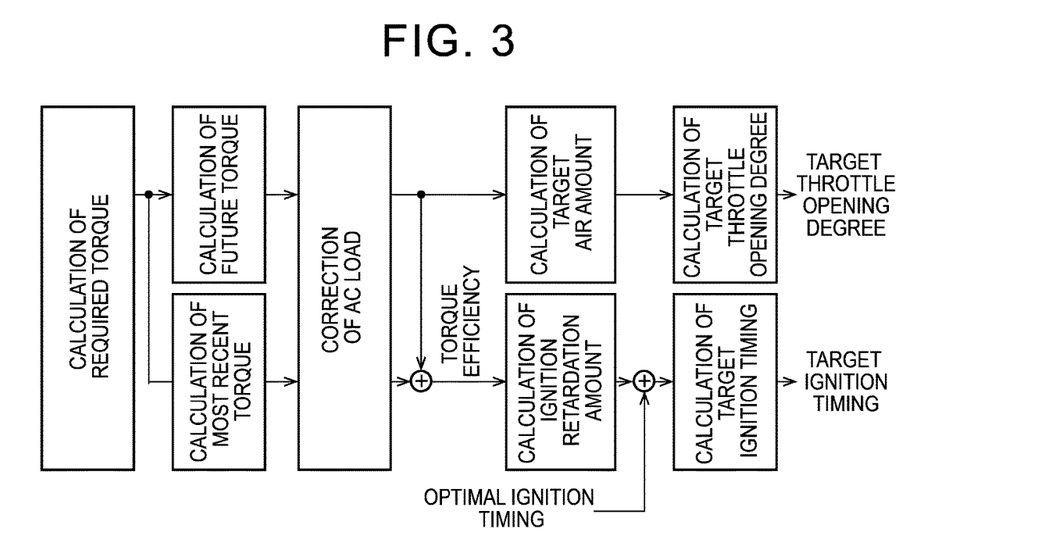
FIG. 3 is a block diagram showing the flow of a process of ISC feedback that is executed in the rotational speed control apparatus.

FIG. 3 shows the flow of a process of this ISC feedback in the form of a block diagram. A series of processing steps shown in the drawing are repeatedly executed by the electronic control unit 25 on a prescribed control cycle.

When this process is started, a required torque as a required value of the engine torque is first calculated. In ISC feedback, this required torque is subjected to a feedback correction corresponding to a deviation of the engine rotational speed NE from the ISC target rotational speed NT (hereinafter referred to as a rotational speed deviation ΔNE). Then, a future torque and a most recent torque are calculated from the required torque. The future torque means an engine torque at the time when the required torque is realized by adjusting the intake air amount within a response-enabling range. On the other hand, the most recent torque means an engine torque at the time when a divergence of the future torque from the required torque, which results from a response lag of the intake air amount, is compensated for by adjusting the ignition timing within an adjustable range.

Next, an AC load correction for adding the load torque of the compressor 24 (an AC load torque) onto the future torque and the most recent torque is carried out. Incidentally, the details of the AC load correction at this time will be described later.

Subsequently, a target air amount is calculated based on the future torque after the AC load correction. The target air amount is calculated as an intake air amount that is needed to ensure an engine torque corresponding to the future torque when the ignition timing is assumed to be an optimal ignition timing. Incidentally, the more retarded one of two ignition timings, namely, a minimum advance for best torque (MBT) as an ignition timing at which the efficiency of generating an engine torque is maximized and a trace knock ignition timing as an advancement limit of the ignition timing that can avoid the occurrence of knocking, is the optimal ignition timing. Then, through the use of an air model as a physical model of an intake system of the engine 10, a throttle opening degree that is needed to realize the target air amount is calculated as a target throttle opening degree. Driving control of the electronically controlled throttle 16 is executed in accordance with the target throttle opening degree.

Furthermore, a torque efficiency is calculated as a ratio between the future torque and the most recent torque after the AC load correction. A retardation amount of the ignition timing (an ignition timing retardation amount) from the optimal ignition timing is calculated based on the torque efficiency. The torque efficiency is a ratio of an actually generated engine torque to an engine torque that is generated when the ignition timing is assumed to be the optimal ignition timing. The ignition retardation amount is calculated from a relationship between an ignition retardation amount that is obtained in advance through an experiment or the like and the torque efficiency. Then, a value obtained by adding the ignition retardation amount to the optimal ignition timing is calculated as a target ignition timing. Driving control of the igniter 31 is executed in accordance with the target ignition timing.

By the way, the AC load torque is obtained through estimation from a difference between a pressure of the cooling medium upstream of the compressor 24 and a pressure of the cooling medium downstream of the compressor 24 (a upstream-downstream differential pressure). A cooling medium pressure upstream of the compressor 24 is acquired from a detected value of the aforementioned cooling medium pressure sensor 29. A cooling medium pressure downstream of the compressor 24 is obtained through estimation from a detected value of the post-evaporation temperature sensor 30.

The AC load torque can be estimated with relatively high accuracy when the compressor 24 is in steady operation. It should be noted, however, that the rising or falling of the AC load torque in the changeover transition period between the driven state of the compressor 24 and the stopped state of the compressor 24 greatly varies depending on the state of the cooling medium. At this time, the accuracy in estimating the AC load torque is not very high. Incidentally, the aforementioned changeover transition period means a period of transition from the stopped state of the compressor 24 to the state where the compressor 24 is in steady operation, and a period of transition from the state where the compressor 24 is in steady operation to the stopped state of the compressor 24.

Therefore, in the changeover transition period as described above, the estimated value of the AC load torque may greatly diverge from an actual value, so the controllability of ISC feedback may deteriorate. In order to restrain the engine rotational speed NE from fluctuating as a result of this deterioration, the feedback gain of ISC feedback needs to be increased such that the engine torque corresponding to the divergence of the estimated value of the AC load torque can be swiftly compensated for. In such a case, however, the feedback gain becomes excessively large in ISC feedback during a normal period other than the changeover transition period. As a result, hyperresponsiveness occurs to cause an engine stall, the racing of the engine rotational speed NE, and the like.

Thus, according to the present embodiment of the invention, changeover transition period control as described below is executed in the changeover transition period, namely, in a prescribed period from the start of a changeover between the stopped state of the compressor 24 and the driven state of the compressor 24.

As described above, in ISC feedback, the future torque as a required value of the engine torque and the most recent torque are subjected to an AC load correction for carrying out a correction corresponding to the AC load torque. In changeover transition period control, the calculated value of the AC load torque used for this AC load correction (hereinafter referred to as an AC control torque) is corrected through feedback in accordance with the rotational speed deviation $\Delta NE$. The feedback correction of this changeover transition period control is carried out in parallel with ISC feedback. Therefore, during the execution of changeover transition period control, the responsiveness of the engine torque to the rotational speed deviation $\Delta NE$ is high.

Incidentally, the feedback correction of changeover transition period control is carried out only in the changeover transition period, and hence does not have an influence on ISC feedback during the normal period. Besides, only the influence of variations in the AC load torque can be directly compensated for through the feedback correction. Therefore, the feedback correction of the engine torque for suppressing rotational fluctuations of the engine resulting from variations in the AC load torque can be carried out with high accuracy.

In passing, this changeover transition period control is executed only when disturbances other than the load torque of the compressor 24 have a weak influence on the engine rotational speed NE during idling stability, that is, during idle operation. In the present embodiment of the invention, a determination condition for idling stability consists in that the accelerator operation amount ACCP is "0", that the temperature of coolant is equal to or higher than a certain value, and that engine auxiliaries other than the compressor 24 are in steady operation.

Figure 4:
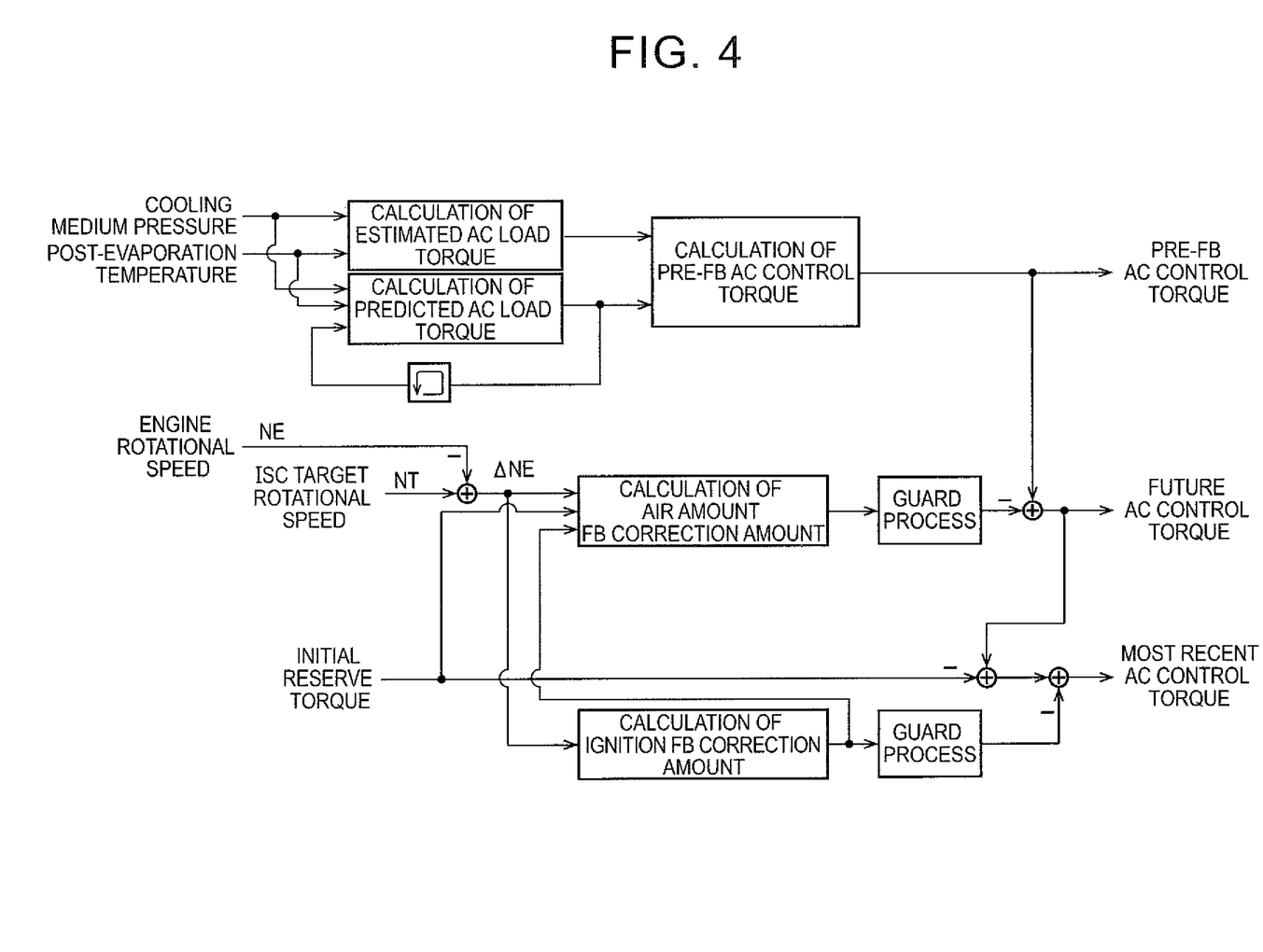
FIG. 4 is a block diagram showing the flow of a process that is executed in the rotational speed control apparatus to calculate an AC control torque.

FIG. 4 shows the flow of a process associated with calculation of an AC control torque in the form of a block diagram. A series of processing steps shown in the drawing are repeatedly executed by the electronic control unit 25 on a prescribed control cycle.

When the present process is started, two values, namely, an estimated AC load torque and a predicted AC load torque are first calculated. The estimated AC load torque is calculated based on a cooling medium pressure and a post-evaporation temperature. The value of the estimated AC load torque represents an AC load torque at the time when the cooling medium pressure and the post-evaporation temperature assume current values respectively while the compressor 24 is in steady operation. Besides, the predicted AC load torque is calculated from a last value thereof (a calculated value of the predicted AC load torque on a last control cycle), the current cooling medium pressure, and the current post-evaporation temperature. More specifically, the value of the predicted AC load torque is calculated by obtaining a rate of change in the AC load torque (an amount of change in the AC load torque to a subsequent calculation cycle) from a deviation between a convergence value of the AC load torque as grasped from the current cooling medium pressure and the current post-evaporation temperature and a last value of the predicted AC load torque, individually on each calculation cycle, and integrating all the values thus obtained.

Then, a pre-FB AC control torque is calculated from this estimated AC load torque and this predicted AC load torque. The value of the pre-FB AC control torque is calculated in such a manner as to assume a value close to the predicted AC load torque in the early stages of the changeover transition period, and to converge to the estimated AC load torque as the terminal stages approach. Incidentally, the pre-FB AC control torque is a correction amount that is added onto the future torque and the most recent torque as an amount corresponding to the AC load torque except during the changeover transition period.

Besides, in the present process, an ignition FB correction amount is calculated based on the rotational speed deviation $\Delta NE$. The ignition FB correction amount represents an amount corresponding to a correction of the torque through feedback adjustment of the ignition timing in the feedback correction of the AC control torque.

Next, an air amount FB correction amount is calculated based on the ignition FB correction amount calculated herein, the rotational speed deviation $\Delta NE$, and an initial reserve torque. The air amount FB correction amount represents an amount corresponding to a correction of the torque through the feedback adjustment of the intake air amount in the feedback correction of the AC control torque. The value of the air amount FB correction amount is calculated as a value that is obtained by subtracting the initial reserve torque and the ignition FB correction amount from a total amount of the feedback correction of the AC control torque.

Incidentally, the ignition timing at the beginning of the changeover transition period is set to a value that is obtained by retarding a base ignition timing, in order to ensure an increase in the engine torque resulting from advancement (a reserve torque). The feedback adjustment of the ignition timing in the changeover transition period is started from that value. The reserve torque that is ensured at the beginning of the changeover transition period on this occasion is the aforementioned initial reserve torque. Incidentally, a mode of setting the initial reserve torque in the present embodiment of the invention will be described later in detail.

Subsequently, guard processes for upper and lower limits of the air amount FB correction amount and the ignition FB correction amount are executed respectively. Incidentally, the details of the guard processes in this case will be described later. After that, a future AC control torque is calculated by subtracting the air amount FB correction amount subjected to the guard process from the pre-FB AC control torque. The value of this future AC control torque represents an AC control torque at the time when the intake air amount corresponding to the air amount FB correction amount is adjusted through feedback with the ignition timing set to the optimal ignition timing.

Subsequently, a most recent AC control torque TQ is calculated by subtracting the ignition FB correction amount subjected to the guard process and the initial reserve torque from the air amount post-correction AC control torque. The value of this most recent AC control torque represents an AC control torque after the feedback adjustment by both the intake air amount and the ignition timing, namely, an AC control torque that is actually generated in ISC feedback in the changeover transition period.

Figure 5:
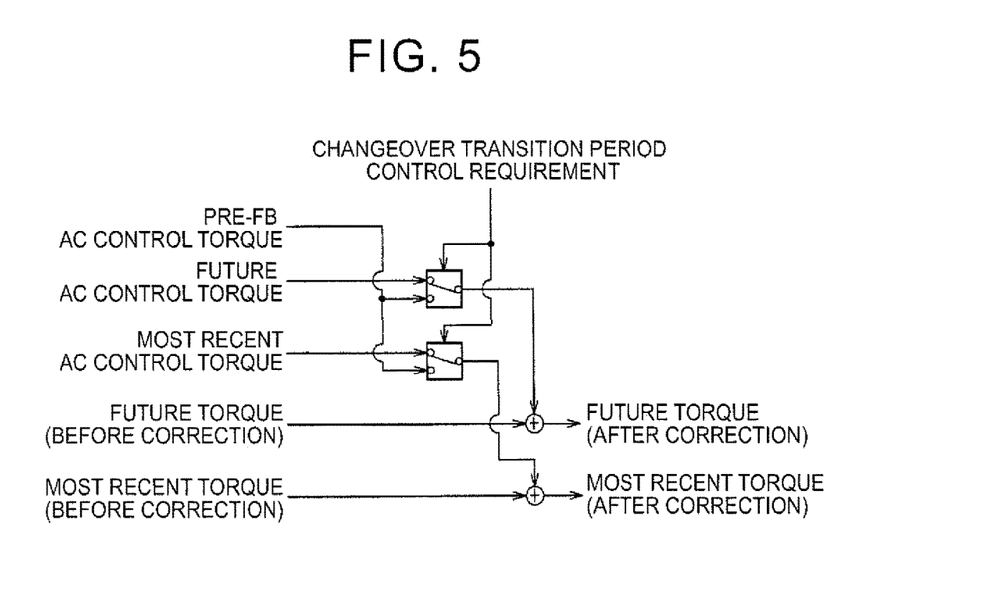
FIG. 5 is a block diagram showing the flow of a process that is executed in the rotational speed control apparatus to correct AC loads of a future torque and a most recent torque.

FIG. 5 shows the flow of a process associated with a correction of the aforementioned AC load in the form of a block diagram. As shown in the drawing, when changeover transition period control is required, the future AC control torque is added onto the future torque, and the most recent AC control torque is added onto the most recent torque. In contrast, when changeover transition period control is not required, the pre-FB AC control torque is added onto each of both the future torque and the most recent torque.

Accordingly, in the changeover transition period, the engine torque corresponding to the air amount FB correction amount is corrected by adjusting the intake air amount, and the engine torque corresponding to the sum of the ignition FB correction amount and the initial reserve torque is corrected by adjusting the ignition timing.

The details of the aforementioned guard processes of the air amount FB correction amount and the ignition FB correction amount will now be described. The guard process of the air amount FB correction amount is executed such that its lower limit is a variation upper limit $\alpha$, and that its upper limit is a value that is obtained by subtracting the initial reserve torque from the pre-FB AC control torque. The variation limit $\alpha$ is a difference in the pre-FB AC control torque from a maximum value of a variation range of the expected AC load torque, and assumes a negative value. On the other hand, the guard process of the ignition FB correction amount is executed such that its lower limit is "0", and that its upper limit is the future AC control torque.

Figure 6:
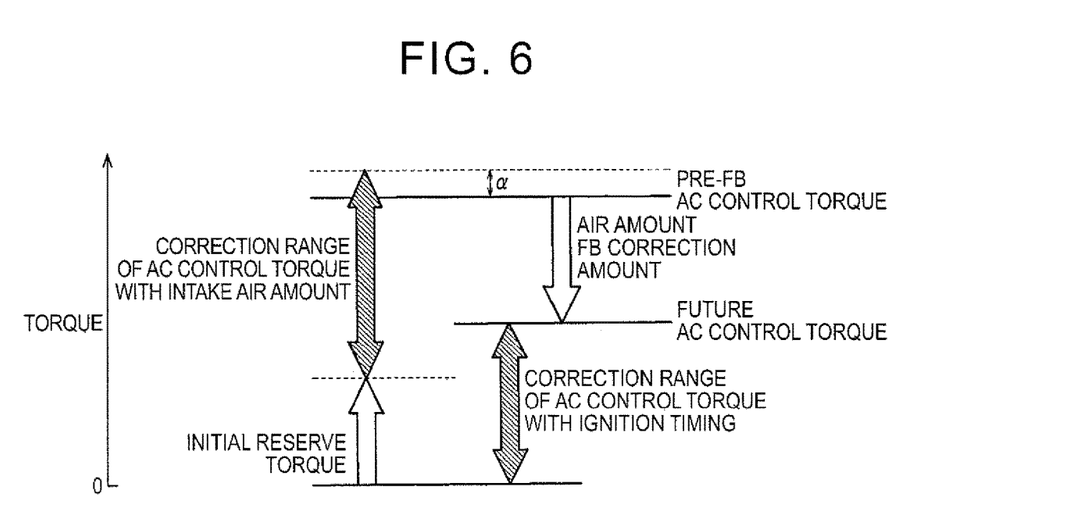
FIG. 6 is a graph showing correction ranges of an AC control torque with an air amount FB correction amount and an ignition FB correction amount for an AC load torque after guard processes, in the rotational speed control apparatus.

FIG. 6 shows correction ranges of the AC control torque through the adjustment of the intake air amount and the adjustment of the ignition timing, which are carried out based on the air amount FB correction amount and the ignition FB correction amount, which have been subjected to these guard processes respectively. As shown in the drawing, the correction range of the AC control torque through the adjustment of the intake air amount is set such that its lower limit is the initial reserve torque, and that its upper limit is the sum of the pre-FB correction AC control torque and the variation upper limit $\alpha$, as a result of the aforementioned guard process. Besides, the correction range of the AC control torque through the adjustment of the ignition timing is set such that its lower limit is "0", and that its upper limit is the future AC control torque, as a result of the aforementioned guard process.

In this case, the range that can be assumed by the value of the actually generated AC control torque, namely, the most recent AC control torque is a range that is equal to or larger than "0" and that is equal to or smaller than the sum of the pre-FB correction AC control torque and the variation upper limit $\alpha$. The sum of the pre-FB correction AC control torque and the variation upper limit $\alpha$ is a maximum value of the expected AC load torque, and the actual AC load torque does not assume a negative value. In consequence, as a result of the aforementioned guard processes, the range that can be assumed by the most recent AC control torque remains within the range of the value that can be assumed by the actual AC load torque. Thus, the engine rotational speed NE is kept from racing or falling to cause an engine stall through erroneous feedback.

On the other hand, when no AC load torque is generated in the changeover transition period, the engine torque is corrected with both the intake air amount and the ignition timing, in order to reduce the actually generated AC control torque, namely, the most recent AC control torque to "0". The value corresponding to the correction with the ignition timing is gradually replaced by the value corresponding to the correction with the intake air amount, with the passage of time. Therefore, if the lower-limit guard as described above is not carried out, the air amount FB correction amount increases until the most recent AC control torque becomes "0" only through the value corresponding to the correction with the intake air amount. Thus, the value corresponding to the correction with the ignition timing, namely, the sum of the ignition FB correction amount and the initial reserve torque becomes "0".

In this case, the ignition timing is advanced to the optimal ignition timing, and no increase in torque results from the advancement of the ignition timing. Therefore, in the event of the sudden emergence of a load of the engine 10, there is no choice but to cope therewith only through the adjustment of the intake air amount that is slow in response. As a result, it is difficult to avoid a fall in the engine rotational speed NE and hence the occurrence of an engine stall.

In this respect, according to the aforementioned guard processes, the lower-limit guard of the air amount FB correction amount is carried out such that the lower limit of the correction range of the AC control torque through the adjustment of the intake air amount becomes the initial reserve torque, and the increase in the engine torque resulting from the advancement of the ignition timing remains at least equal to a value corresponding to the initial reserve torque. Therefore, even in the event of the sudden emergence of a load, it is possible to immediately cope therewith to a certain extent through the advancement of the ignition timing.

Besides, when the post-correction AC control torque obtained through the adjustment of the ignition timing, namely, the most recent AC control torque exceeds the future AC control torque, the ignition timing is excessively advanced beyond the optimal ignition timing. In this respect, according to the aforementioned guard processes, the lower-limit guard of the ignition FB correction amount is carried out such that the most recent AC control torque remains equal to or smaller than the future AC control torque, so the ignition timing is kept from being excessively advanced.

By the way, when the driving of the compressor 24 is started, the pressure in the crank chamber 34A needs to be adjusted such that the angle $\phi$ of inclination of the swash plate 37 becomes a value required by the air-conditioning control unit 33, and the AC load torque undergoes variations corresponding to the control accuracy of the pressure. On the other hand, the stop of the driving of the compressor 24 is achieved if the pressure in the crank chamber 34A is sufficiently raised and the swash plate 37 is pressed against an end of its tiltable range in such a direction that the angle of inclination decreases. Therefore, the variations in the AC load torque and the period needed for the convergence thereof are smaller and shorter than when the driving is started. Thus, according to the present embodiment of the invention, the execution period of changeover transition period control is set longer in a changeover transition period from the stopped state of the compressor 24 to the driven state of the compressor 24 than in a changeover transition period from the driven state of the compressor 24 to the stopped state of the compressor 24. Besides, with a view to coping with variations in the AC load torque, the initial reserve torque is set larger in a changeover transition period from the stopped state of the compressor 24 to the driven state of the compressor 24 than in a changeover transition period from the driven state of the compressor 24 to the stopped state of the compressor 24.

On the other hand, if the compressor 24 is stopped for a long time under a low-temperature environment, the cooling medium inside the compressor 24 may be cooled to be liquefied and accumulated inside the crank chamber 34A. That is, a so-called liquid pool may be formed. When a liquid pool is formed, the AC load torque hardly increases until the liquefied cooling medium is removed from the crank chamber 34A. Therefore, when there is formed a liquid pool in a changeover transition period from the stopped state of the compressor 24 to the driven state of the compressor 24, the convergence of the AC load torque takes a very long time. Besides, there is also a very large divergence of the AC control torque from the actual AC load torque. Thus, according to the present embodiment of the invention, when there is a possibility of a liquid pool being formed in a changeover transition period from the stopped state of the compressor 24 to the driven state of the compressor 24, the execution period of changeover transition period control is set longer and the initial reserve torque is set larger than when there is no possibility of a liquid pool being formed in a changeover transition period from the stopped state of the compressor 24 to the driven state of the compressor 24.

Figure 7:
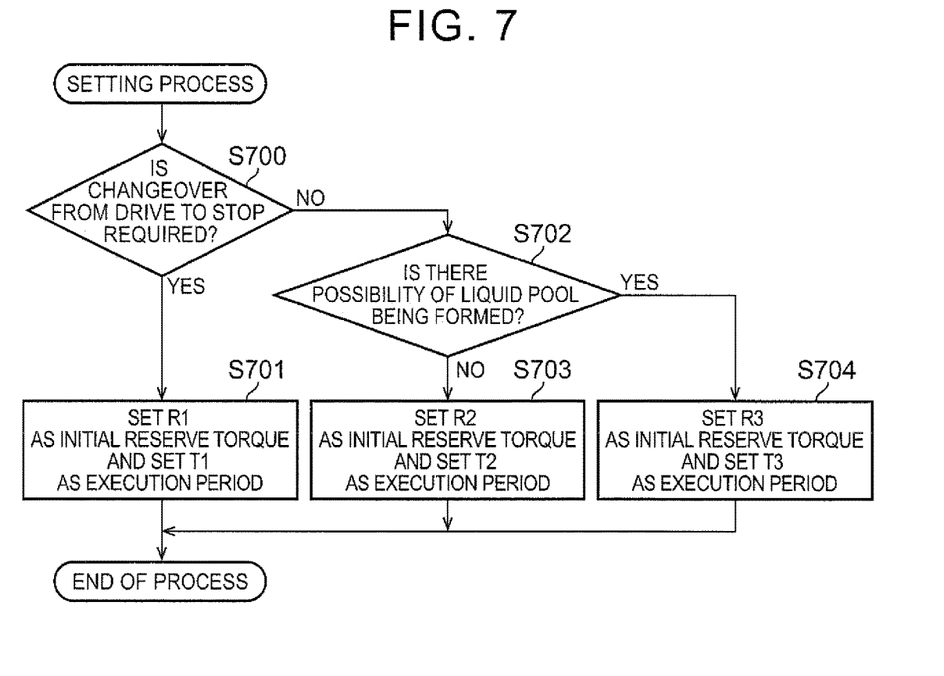
FIG. 7 is a flowchart showing the procedure of a process that is executed in the rotational speed control apparatus to set an initial reserve torque and an execution period of changeover transition control.

FIG. 7 shows a flowchart of this process of setting an execution period of changeover transition period control and an initial reserve torque. This process is executed by the electronic control unit 25 when a changeover between the driven state of the compressor 24 and the stopped state of the compressor 24 is required. In the present routine, it is determined first in step S700 whether or not a changeover from the driven state of the compressor 24 to the stopped state of the compressor 24 has been required. If a changeover from the driven state to the stopped state has been required herein (YES in S700), the process is advanced to step S701. Then in step S701, a relatively small value R1 is set as the initial reserve torque, and a relatively short time T1 is set as the execution period of changeover transition period control.

On the other hand, if a changeover from the driven state to the stopped state has not been required (NO in S700), the process is advanced to step S702. It is then determined in step S702 whether or not there is a possibility of a liquid pool being formed. The determination on the possibility of a liquid pool being formed can be made by determining, based on, for example, an outside air temperature and an elapsed time from the last stoppage of the compressor 24, that there is a possibility of a liquid pool being formed, when the outside air temperature is lower than a prescribed value and the elapsed time is longer than a prescribed value.

It should be noted herein that if it is determined that there is no possibility of a liquid pool being formed (NO in S702), the process is advanced to step S703. In step S703, a value R2 that is larger than the aforementioned value R1 is set as the initial reserve torque, and a time T2 that is longer than the aforementioned time T1 is set as the execution period of changeover transition period control. On the other hand, if it is determined that there is a possibility of a liquid pool being formed (YES in S702), the process is advanced to step S704. In step S704, a value R3 that is larger than the aforementioned value R2 is set as the initial reserve torque, and a time T3 that is longer than the aforementioned time T2 is set as the execution period of changeover transition period control.

Incidentally, the aforementioned requirement of changeover transition period control is regarded as ON (there is a requirement) when a changeover between the driven state of the compressor 24 and the stopped state of the compressor 24 is required. Then, the aforementioned requirement of changeover transition period control is regarded as OFF (there is no requirement) as soon as the execution period set in the present routine elapses from that time point.

Subsequently, the operation of the aforementioned engine rotational speed control apparatus according to the present embodiment of the invention will be described. As described above, with the engine rotational speed control apparatus according to the present embodiment of the invention, the load torque of the compressor 24 is calculated as the pre-FB AC control torque, and the engine torque corresponding to the load torque is usually corrected based on the AC control torque (the pre-FB AC control torque). On the other hand, in a changeover transition period of the compressor 24, the engine torque is corrected based on the future AC control torque and the most recent AC control torque that are obtained by correcting the pre-FB AC control torque through feedback in accordance with the deviation of the engine rotational speed NE from the ISC target rotational speed NT (the rotational speed deviation $\Delta NE$).

This pre-FB AC control torque is corrected through feedback as a feedback other than ISC feedback. Then, the feedback correction of the pre-FB AC control torque is reflected by the actual engine torque only in a changeover transition period, and the range of its influence is limited to the range corresponding to the AC load torque. Therefore, no matter how large the feedback gain of the feedback correction of this pre-FB AC control torque is set, the responsiveness of ISC feedback except in the changeover transition period does not become excessive. In consequence, if the feedback gain of the feedback correction of the pre-FB AC control torque is set to a sufficiently large value, rotational fluctuations of the engine resulting from variations in the AC load torque during a changeover transition can be favorably suppressed without causing hyperresponsiveness of normal ISC feedback.

Figure 8:
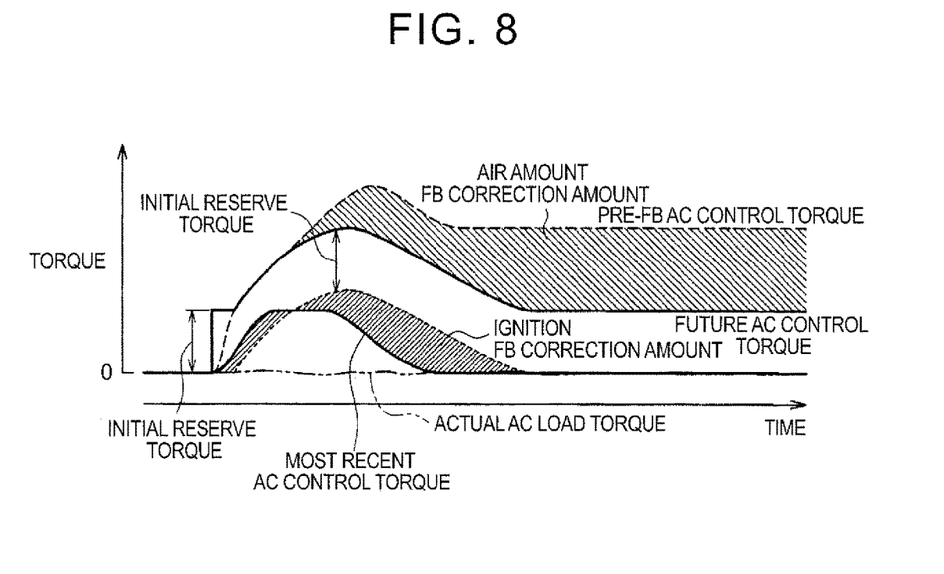
FIG. 8 is a time chart showing an example of a control pattern of a changeover transition period from stoppage of a compressor to the driving of the compressor in the case where there is formed a liquid pool, in the rotational speed control apparatus.

FIG. 8 shows an example of a control pattern of the engine rotational speed control apparatus according to the present embodiment of the invention. In the drawing, there is shown a control example in which the start of the driving of the compressor 24 is required at a time t1 when a liquid pool is formed. Incidentally, at this time, it is predicted from the circumstances that there is a possibility of a liquid pool being formed. The initial reserve torque is set to the large value (R3), and the execution period of changeover transition period control is set to the long time (T3).

The pre-FB AC control torque as an estimated value of the AC load torque changes as follows. That is, the pre-FB AC control torque is increased stepwise by the value corresponding to the initial reserve torque when the driving of the compressor 24 is started. After that, the pre-FB AC control torque gradually increases, and converges to a certain value in the course of time. In contrast, due to a liquid pool, the actual AC load torque on this occasion has hardly increased even after the start of driving, and has greatly diverged from the pre-FB AC control torque.

At this time, according to the present embodiment of the invention, as soon as the start of the driving of the compressor 24 is required, changeover transition period control is executed, and the feedback correction of the AC control torque corresponding to the rotational speed deviation $\Delta NE$ is started. It should be noted, however, that since the rotational speed deviation $\Delta NE$ does not increase immediately after the start of the driving of the compressor 24, the air amount FB correction amount is still close to "0" and the future AC control torque changes along the pre-FB AC control torque. On the other hand, when driving is started, the most recent AC control torque is smaller than the pre-FB AC control torque by the value corresponding to the initial reserve torque. Therefore, immediately after the start of driving, the ignition FB correction amount temporarily assumes such a value as to increase the torque (to advance the ignition timing).

When a certain length of time elapses after the start of driving, the engine rotational speed NE rises due to a divergence between the actual AC load torque and the pre-FB AC control torque. Therefore, with a view to reducing the most recent AC control torque as an AC control torque that is actually generated in the present control, the feedback correction begins to take effect. Then, as a result, the engine rotational speed NE that has temporarily risen falls toward the ISC target rotational speed NT. Incidentally, at a stage where this feedback correction has just begun to take effect, the air amount FB correction amount can be changed only gradually in conformity with the response of the intake air amount. Therefore, the correction is carried out mainly with the ignition FB correction amount. The value corresponding to the correction of the AC control torque with the ignition FB correction amount is gradually replaced by the value corresponding to the AC control torque with the air amount FB correction amount, with the passage of time. Then, in the course of time, the ignition. FB correction amount decreases to a value close to "0" as is the case with the actual AC load torque, and the majority of the value corresponding to the necessary feedback correction is compensated for by the air amount FB correction amount.

Incidentally, even at a stage where the respective values of the AC control torque have substantially converged to a constant value, a difference corresponding to the initial reserve torque is maintained between the future AC control torque and the most recent AC control torque, due to the upper guard of the air amount FB correction amount. Thus, there is held a state where the increase in torque resulting from the advancement of the ignition timing for coping with the sudden emergence of an engine load is ensured. Incidentally, changeover transition period control is ended upon the lapse of the aforementioned time T3 from the start thereof.

Incidentally, according to the present embodiment of the invention described above, the pre-FB AC control torque is equivalent to the calculated value of the load torque of the compressor 24. Besides, the future AC control torque and the most recent AC control torque assume values that are obtained by correcting the calculated value of the load torque through feedback in accordance with the deviation between the rotational speed of the engine 10 and the target rotational speed. Furthermore, out of those values, the future AC control torque corresponds to the required value of the first load torque associated with the adjustment of the intake air amount, and the most recent AC control torque corresponds to the required value of the second load torque associated with the adjustment of the ignition timing. Then, the air amount FB correction amount corresponds to the feedback correction amount based on the required value of the first load torque associated with the adjustment of the intake air amount, and the sum of the air amount FB correction amount, the ignition FB correction amount, and the initial reserve torque corresponds to a total amount of the feedback correction of the load torque.

With the engine rotational speed control apparatus according to the present embodiment of the invention described above, the following effects can be achieved. (1) The engine rotational speed control apparatus according to the present embodiment of the invention corrects the engine torque during idle operation of the engine 10 that drives the compressor 24 that compresses the cooling medium for air conditioning, through feedback, in accordance with the deviation between the engine rotational speed NE and the ISC target rotational speed NT (the rotational speed deviation ΔNE). Then, when a changeover between the driven state of the compressor 24 and the stopped state of the compressor 24 is made during idling stability of the engine 10, changeover transition period control is executed for a prescribed time from the start of the changeover. In changeover transition period control, the pre-FB AC control torque as the calculated value of the load torque of the compressor 24, which is used for the feedback correction of the aforementioned engine torque, is corrected through feedback in accordance with the rotational speed deviation ΔNE. The feedback correction of the pre-FB AC control torque is carried out only in the changeover transition period, and hence does not have an influence on ISC feedback during the normal period. Furthermore, the feedback correction of the pre-FB AC control torque makes it possible to directly compensate for only the value corresponding to the influence of variations in the AC load torque. Therefore, the feedback correction of the engine torque for suppressing rotational fluctuations of the engine 10 resulting from variations in the AC load torque can be carried out with high accuracy. Accordingly, rotational fluctuations of the engine in the changeover transition period between the driving of the compressor and the stoppage of the compressor can be favorably suppressed without causing hyperresponsiveness of feedback control of the engine rotational speed during idle operation.

(2) The lower limit is set such that the most recent AC control torque as a post-feedback correction value of the pre-FB AC control torque does not assume a negative value, through the lower-limit guard of the ignition FB correction amount. Therefore, the engine rotational speed NE is restrained from excessively falling through erroneous feedback, so the tolerance for an engine stall is enhanced.

(3) In changeover transition period control, the feedback correction of the calculated value of the AC load torque (the pre-FB AC control torque) is carried out making a distinction between the future AC control torque as the required value of the load torque associated with the adjustment of the intake air amount and the most recent AC control torque as the required value of the load torque associated with the adjustment of the ignition timing. Then, the air amount FB correction amount as the value of the feedback correction distributed to the future AC control torque is subjected to the upper-limit guard such that the value thereof does not exceed a value that is obtained by subtracting the initial reserve torque from the total amount of the feedback correction. As a result, engine torque control in the changeover transition period is executed such that the increase in engine torque corresponding to the initial reserve torque resulting from advancement of the ignition timing is maintained. Therefore, no matter when a sudden decrease in engine torque occurs, it is possible to immediately cope therewith through the advancement of the ignition timing. As a result, the tolerance for an engine stall is further enhanced.

(4) The reserve torque that is ensured when a changeover from the stopped state of the compressor 24 to the driven state of the compressor 24 is started is set larger than the reserve torque that is ensured when a changeover from the driven state of the compressor to the stopped state of the compressor is started. Besides, even during a changeover from the stopped state of the compressor 24 to the driven state of the compressor 24, the reserve torque that is ensured when the changeover is started is set larger when there is a possibility of a liquid pool being formed than when there is no possibility of a liquid pool being fainted. In this embodiment of the invention, the reserve torque that is ensured when a changeover is started, namely, the initial reserve torque is set in accordance with the degree of variations in the load torque at that time. Therefore, the reserve torque can be prevented from becoming excessively large, while ensuring the range of torque adjustment by the ignition timing that is needed to suppress rotational fluctuations of the engine resulting from the variations. Accordingly, while favorably suppressing rotational fluctuations of the engine 10 resulting from variations in the AC load torque in the changeover transition period, fuel economy can be restrained from deteriorating as a result of a contradiction thereto.

(5) The execution period of changeover transition period control that is executed to make the responsiveness of the engine torque to the rotational speed deviation ΔNE higher than in ISC feedback during the normal period is set longer in a changeover transition period from the stopped state of the compressor 24 to the driven state of the compressor 24 than in a changeover transition period from the driven state of the compressor 24 to the stopped state of the compressor 24. Besides, even during a changeover from the stopped state of the compressor 24 to the driven state of the compressor 24, the execution period of changeover transition period control is set longer when there is a possibility of a liquid pool being formed than when there is no possibility of a liquid pool being formed. In this embodiment of the invention, the execution period of changeover transition period control is changed in accordance with the convergence properties of the AC load torque at that time. Therefore, while favorably suppressing rotational fluctuations of the engine 10 resulting from the AC load torque in the changeover transition period, hyperresponsiveness can be restrained from occurring as a contradiction thereto.

Incidentally, the aforementioned embodiment of the invention can also be carried out after being modified as follows. In the foregoing embodiment of the invention, it is determined, from the elapsed time from the previous stoppage of the compressor 24 and the outside air temperature, whether or not there is a possibility of a liquid pool being formed. However, the determination may be made in other modes. For example, it is also possible to determine, from a change in the engine rotational speed NE immediately after the start of a changeover, whether or not an AC load torque has been generated, and thereby make a determination on the presence/absence of the aforementioned possibility.

In the aforementioned embodiment of the invention, the engine 10 is assumed to be in idling stability when the accelerator operation amount ACCP is "0", the temperature of coolant for the engine 10 is equal to or higher than a certain value, and the auxiliaries other than the compressor 24 are in steady operation. This determination condition during idling stability may be appropriately changed. For example, it is determined that the engine 10 is in idling stability when the fluctuation range of the engine rotational speed NE is confined within a prescribed range for a prescribed period.

In the aforementioned embodiment of the invention, the load torque of the compressor 24 is calculated through estimation from the difference between the pressure of the cooling medium upstream of the compressor 24 and the pressure of the cooling medium downstream of the compressor 24. However, the load torque of the compressor 24 may be calculated according to other methods. In the aforementioned embodiment of the invention, the magnitude of the initial reserve torque in the changeover transition period from the stopped state to the driven state, and the length of the execution period of changeover transition period control are changed depending on whether or not there is a possibility of a liquid pool being formed. However, one or both of those values may not be changed depending on whether or not there is a possibility of a liquid pool being formed.

In the aforementioned embodiment of the invention, the magnitude of the initial reserve torque and the length of the execution period of changeover transition period control are changed depending on whether the transition period is associated with a changeover from the stopped state to the driven state or a changeover from the driven state to the stopped state. However, one or both of those values may not be changed.

In the aforementioned embodiment of the invention, the value of the air amount FB correction amount as the amount of adjustment of the engine torque corresponding to the AC control torque resulting from the correction of the intake air amount is guarded so as not to exceed the value that is obtained by subtracting the initial reserve torque from the pre-FB AC control torque. In the case where the feedback correction of the AC control torque is made also in charge of a compensation for the load torque of those other than the compressor 24 etc., the air amount FB correction amount may be allowed to exceed the value that is obtained by subtracting the initial reserve torque from the pre-FB AC control torque.

In the aforementioned embodiment of the invention, two values, namely, the future AC control torque and the most recent AC control torque are obtained as values that are obtained by correcting the AC control torque as the calculated value of the AC load torque through feedback. The feedback correction of the AC control torque in the changeover transition period is carried out by correcting the future torque and the most recent torque of ISC feedback with those two values. Instead, the required torque of ISC feedback may be more simply corrected with the value that is obtained by correcting the AC control torque through feedback. In such a case as well, the feedback correction of the AC control torque in the changeover transition period is carried out as a feedback other than ISC feedback. Therefore, only the feedback correction of the AC control torque in the changeover transition period can be made to respond early without influencing normal ISC feedback.

What is claimed is:

1. A rotational speed control apparatus for an engine, the engine configured to drive a compressor that compresses a cooling medium for air conditioning, the rotational speed control apparatus comprising:
an electronic control unit configured to:
(a) correct a torque of the engine through feedback in accordance with a deviation between a rotational speed during idle operation and a target rotational speed;
(b) (i) calculate a load torque of the compressor, and (ii) correct the calculated load torque through feedback in accordance with a deviation between the rotational speed of the engine and the target rotational speed and correct a required value of the torque of the engine in accordance with the corrected load torque, in a predetermined period from a start of a changeover between a driven state of the compressor and a stopped state of the compressor, the start of the changeover being during idling stability of the engine;
wherein a first period of the changeover from the stopped state of the compressor to the driven state of the compressor is set longer than a second period of the changeover from the driven state of the compressor to the stopped state of the compressor, the first period of changeover comprises a convergence of the load torque to a stable value through an increase from 0, the second period of changeover comprises a convergence of the load torque to 0 through a decrease, and the electronic control unit is further configured to determine if there is a possibility of a liquid pool of cooling medium in a crank chamber of the compressor based on an outside air temperature and an elapsed time from a last stoppage of the compressor, and if the electronic control unit determines that the possibility of the liquid pool of cooling medium in the crank chamber of the compressor exists, then the first period of the changeover from the stopped state of the compressor to the driven state of the compressor is longer than when the electronic control unit determines that there is no possibility of the liquid pool of cooling medium being in the crank chamber of the compressor, wherein when the outside air temperature is lower than a predetermined value and the elapsed time is longer than a predetermined value, the electronic control unit determines that the possibility of the liquid pool of cooling medium in the crank chamber of the compressor exists.

2. The rotational speed control apparatus according to claim 1, wherein the electronic control unit is configured to set a lower limit of the corrected load torque, such that the corrected load torque does not become negative.

3. The rotational speed control apparatus according to claim 1, wherein the electronic control unit is configured to correct the load torque through the feedback separately for a first required value of the load torque associated with adjustment of an intake air amount and a second required value of the load torque associated with adjustment of an ignition timing, and the electronic control unit is configured to set a correction amount through the feedback based on the first required value of the load torque such that the correction amount based on the first required value of the load torque does not exceed a value that is obtained by subtracting a predetermined reserve torque from a total correction amount of the load torque thorough the feedback.

4. The rotational speed control apparatus according to claim 1, wherein the electronic control unit is configured to calculate the load torque based on a difference between a pressure of a cooling medium upstream of the compressor and a pressure of the cooling medium downstream of the compressor.

5. The rotational speed control apparatus according to claim 1, wherein in the first period of changeover, an initial reserve torque is larger than in the second period of changeover.

* * * * *